United States Patent
Lee et al.

(10) Patent No.: US 11,578,796 B2
(45) Date of Patent: Feb. 14, 2023

(54) METHOD FOR CONTROLLING EOP OF HYBRID VEHICLE

(71) Applicants: Hyundai Motor Company, Seoul (KR); Kia Corporation, Seoul (KR)

(72) Inventors: Kyung Moo Lee, Yongin-si (KR); Seong Min Son, Pohang-si (KR); Se Hwan Jo, Bucheon-si (KR); Bong Uk Bae, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/511,832

(22) Filed: Oct. 27, 2021

(65) Prior Publication Data

US 2022/0381334 A1 Dec. 1, 2022

(51) Int. Cl.
*B60K 6/387* (2007.10)
*F16D 48/06* (2006.01)
*B60W 10/02* (2006.01)
*F16H 61/00* (2006.01)
*F16H 57/04* (2010.01)

(52) U.S. Cl.
CPC ......... *F16H 57/0445* (2013.01); *B60K 6/387* (2013.01); *B60W 10/02* (2013.01); *F16D 48/066* (2013.01); *F16H 57/0435* (2013.01); *F16H 61/0031* (2013.01); *B60L 2240/50* (2013.01); *F16D 2500/10412* (2013.01); *F16D 2500/30803* (2013.01); *F16D 2500/30806* (2013.01)

(58) Field of Classification Search
CPC ............. F16H 57/0445; F16H 57/0435; F16H 61/0031; B60K 6/387; F16D 2500/10412; F16D 2500/30803; F16D 2500/30806; F16D 48/066; B60W 10/02; B60L 2240/50
See application file for complete search history.

(56) References Cited

U.S. PATENT DOCUMENTS

2014/0083811 A1* 3/2014 Ito ........................... F16D 48/02
192/85.63
2015/0019073 A1* 1/2015 Lee ....................... B60W 10/08
701/36
(Continued)

FOREIGN PATENT DOCUMENTS

KR 102053434 B1 12/2019

*Primary Examiner* — Tisha D Lewis
(74) *Attorney, Agent, or Firm* — Morgan, Lewis & Bockius LLP

(57) ABSTRACT

A method for controlling an electric oil pump (EOP) of a hybrid vehicle may include determining whether or not the hybrid vehicle is in a decelerating situation in an EV mode, driving the EOP at an RPM at a point L, corresponding to a minimum RPM of the EOP to form a target line pressure of a transmission, upon determining that the hybrid vehicle is decelerating in the EV mode, determining whether or not an RPM of a turbine is equal to or greater than a predetermined reference RPM, and driving the EOP at an RPM acquired by adding a predetermined additional RPM to secure an additional flow rate of automatic transmission fluid supplied to a balance chamber of an engine clutch to the RPM at the point L, upon determining that the RPM of the turbine is equal to or greater than the predetermined reference RPM.

11 Claims, 6 Drawing Sheets

(56) References Cited

U.S. PATENT DOCUMENTS

2016/0003346 A1* 1/2016 Lee .................... F16H 57/0447
                                                    701/22
2017/0282904 A1* 10/2017 Morita ................ B60K 6/387

* cited by examiner

FIG. 5

| TEMP. OF ATF | -30°C | -20°C | -10°C | 40°C | 50°C | 80°C | 100°C | 120°C | 130°C |
|---|---|---|---|---|---|---|---|---|---|
| RPM OF EOP (RPM) | L1 + α1 | L2 + α2 | L3 + α3 | L4 + α4 | L5 + α5 | L6 + α6 | L7 + α7 | L8 + α8 | L9 + α9 |

METHOD FOR CONTROLLING EOP OF HYBRID VEHICLE

CROSS-REFERENCE TO RELATED APPLICATION

The present application claims priority to Korean Patent Application No. 10-2021-0067159, filed on May 25, 2021, the entire contents of which is incorporated herein for all purposes by this reference.

BACKGROUND OF THE INVENTION

Field of the Invention

The present invention relates to a method for controlling an electric oil pump (EOP) provided to supply a necessary hydraulic pressure to a transmission of a hybrid vehicle.

Description of Related Art

Because a hybrid vehicle is not capable of securing full-time driving of an engine, such as in case of idle stop, many hybrid vehicles are provided with an electric oil pump (EOP) configured to generate the hydraulic pressure of oil to facilitate operation, lubrication and cooling of a transmission independently of driving of an engine, some hybrid vehicles are provided with only an electric oil pump without a mechanical oil pump, and the present invention relates to a vehicle provided with only an electric oil pump.

Hydraulic pressure supplied by the electric oil pump is used as a control hydraulic pressure for lubrication and cooling of a transmission or shifting of the transmission and a control hydraulic pressure for an engine clutch configured to intermittently connect the engine and the transmission.

The engine clutch transmits power in a manner in which a piston moves forwards due to applied hydraulic pressure and thus generates frictional force towards a plurality of clutch packs, and to disengage the engine clutch, when the hydraulic pressure applied to the piston is released, the piston moves backwards due to a return spring and thus releases the frictional force from the clutch packs.

Because the engine clutch is disengaged so that the power of the engine is not transmitted to a motor and a transmission in an electric vehicle (EV) mode, in which the hybrid vehicle is driven using only the motor, but is continuously rotated, the oil remaining in the engine clutch causes the piston to undesirably pressurize the clutch packs due to centrifugal force, thereby being capable of causing damage to the engine clutch due to slip.

Conventionally, to prevent the above problem, a balance chamber is provided between the piston and a retainer, and the oil is supplied into the balance chamber to prevent the piston from moving forwards due to the centrifugal force. However, in the instant case, when the oil is not smoothly supplied into the balance chamber, the above-described damage to the engine clutch still remains.

There is a high probability of such a problem in the case that, in a hybrid vehicle provided with only an electric oil pump, driving of the electric oil pump is minimized as much as possible to improve the energy efficiency or fuel efficiency of the hybrid vehicle and to improve durability of the electric oil pump.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling an electric oil pump (EOP) of a vehicle which may improve the fuel efficiency or energy efficiency of the hybrid vehicle by minimizing driving of the EOP as much as possible, and may appropriately secure the flow rate of automatic transmission fluid (ATF) supplied to a balance chamber of an engine clutch to prevent damage to the engine clutch and to improve durability thereof.

In accordance with an aspect of the present invention, the above and other objects may be accomplished by the provision of a method for controlling an electric oil pump (EOP) of a hybrid vehicle, the method including determining whether or not the hybrid vehicle is in a decelerating situation in an electric vehicle (EV) mode, driving the EOP at revolutions per minute (RPM) at a point L, which corresponds to a minimum RPM of the EOP to form a target line pressure of a transmission, upon determining that the hybrid vehicle is decelerating in the EV mode, determining whether or not an RPM of a turbine is equal to or greater than a predetermined reference RPM, and driving the EOP at an RPM acquired by adding a predetermined additional RPM to secure an additional flow rate of automatic transmission fluid supplied to a balance chamber of an engine clutch to the RPM at the point L, upon determining that the RPM of the turbine is equal to or greater than the predetermined reference RPM.

The driving the EOP at the RPM acquired by adding the additional RPM to the RPM at the point L may be terminated when the RPM of the turbine is equal to or less than a predetermined release RPM lower than the predetermined reference RPM.

The driving the EOP at the RPM acquired by adding the additional RPM to the RPM at the point L may be terminated when a predetermined maintenance time elapses.

The point L and the additional RPM may be set differently depending on a temperature of the automatic transmission fluid.

The predetermined reference RPM may be set to a level at which unintended frictional force of the engine clutch due to centrifugal force of the engine clutch is generated.

In accordance with another aspect of the present invention, there is provided a method for controlling an electric oil pump (EOP) of a hybrid vehicle, the method including determining whether or not the hybrid vehicle is in a decelerating situation in an EV mode, driving the EOP at an RPM at a point L, corresponding to a minimum RPM of the EOP to form a target line pressure of a transmission, upon determining that the hybrid vehicle is decelerating in the EV mode, determining whether or not the hybrid vehicle is in a situation in which downshift from a current gear to a lower gear is required, and driving the EOP at an RPM acquired by adding a predetermined additional RPM to secure an additional flow rate of automatic transmission fluid supplied to a balance chamber of an engine clutch to the RPM at the point L, upon determining that the downshift is required.

The driving the EOP at the RPM acquired by adding the additional RPM to the RPM at the point L may be terminated when an RPM of a turbine is equal to or less than a predetermined release RPM after downshift is completed.

The driving the EOP at the RPM acquired by adding the additional RPM to the RPM at the point L may be terminated when a predetermined maintenance time elapses after downshift is completed.

The point L and the additional RPM may be set differently depending on a temperature of the automatic transmission fluid.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a table representing a map of the RPM of the EOP depending on the temperature of the ATF.

Figure 1:
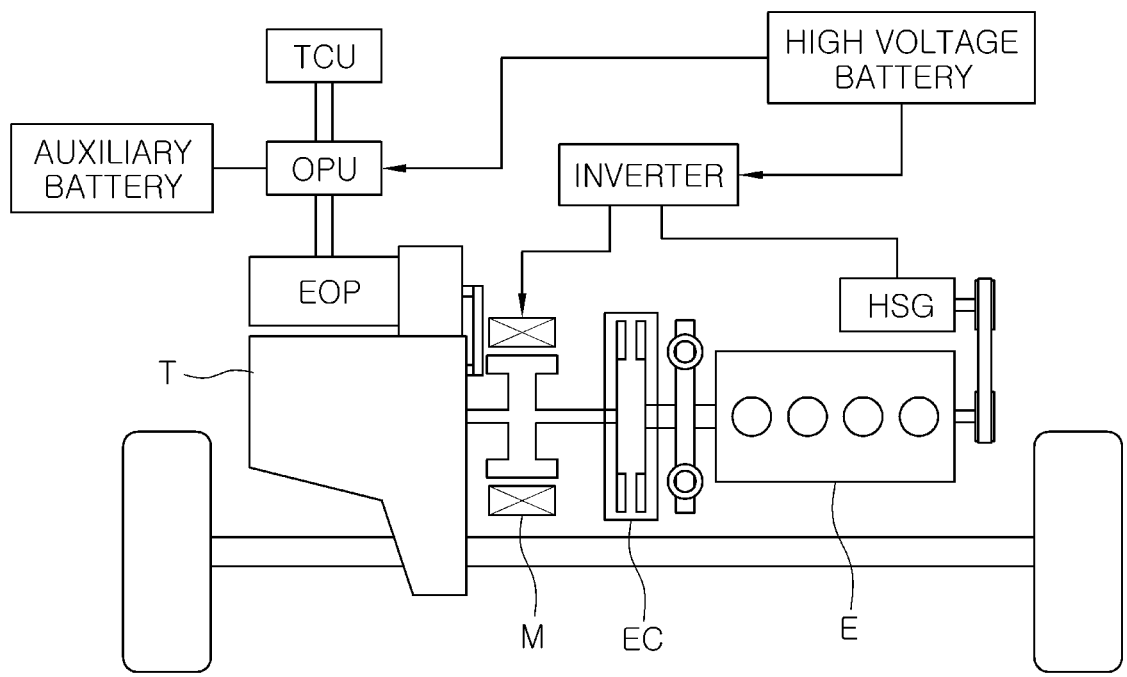
FIG. 1 is a schematic view exemplarily illustrating the powertrain apparatus of a hybrid vehicle to which various exemplary embodiments of the present invention is applicable.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural or functional descriptions in embodiments of the present invention set forth in the description which follows will be exemplarily provided to describe the exemplary embodiments of the present invention. However, the present invention may be embodied in many alternative forms, and should not be construed as being limited to the exemplary embodiments set forth herein.

The exemplary embodiments of the present invention may be variously modified and changed, and thus specific embodiments of the present invention will be illustrated in the drawings and described in detail in the following description of the exemplary embodiments of the present invention. However, it will be understood that the exemplary embodiments of the present invention are provided only to completely disclose the present invention and cover modifications, equivalents or alternatives which come within the scope and technical range of the present invention.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to various embodiments of the present invention, examples of which are illustrated in the accompanying drawings and described below. In the drawings, the same or similar elements are denoted by the same reference numerals even when they are depicted in different drawings.

FIG. 1 is a schematic view exemplarily illustrating the powertrain apparatus of a hybrid vehicle to which various exemplary embodiments of the present invention is applicable, and the power train of the hybrid vehicle is configured such that the power of an engine E may be transmitted to a transmission T through an engine clutch EC, and a motor M may be provided at an input shaft of the transmission T.

An electric oil pump (EOP), which is controlled by an oil pump control unit (OPU) and generates a flow rate of oil used to control the transmission T and the engine clutch EC, is provided in the transmission T.

For reference, a hybrid starter and generator (HSG) is provided in the engine E to start the engine E and to generate power, and the motor M is provided to be controlled by an inverter.

The transmission T is controlled by a transmission control unit (TCU), the OPU is controlled by the TCU, and thus, the present invention may be substantially performed by a controller, such as the TCU or the OPU, and the OPU is configured to directly drive the EOP under instructions from the TCU.

Figure 2:
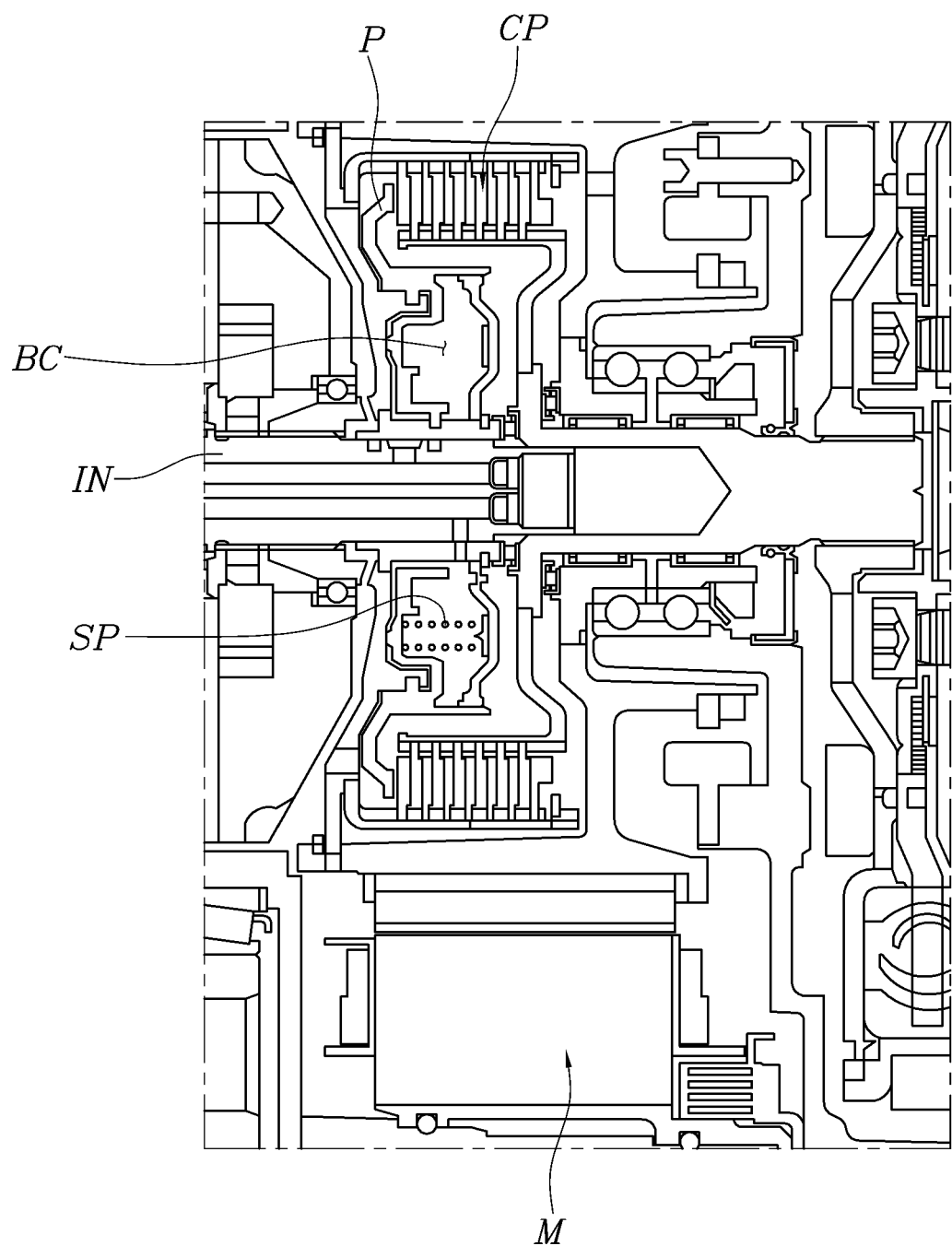
FIG. 2 is a view exemplarily illustrating the structure of an engine clutch to which various exemplary embodiments of the present invention is applied.

The engine clutch EC may be configured, as shown in FIG. 2, such that, when hydraulic pressure is applied to a piston P, the piston P pressurizes clutch packs CP to connect the engine to the input shaft IN of the transmission, and when the hydraulic pressure is released, the piston P returns to the original position thereof by a return spring SP.

A balance chamber BC, i.e., a space in which the return spring SP of the engine clutch EC is provided, is configured such that portion of automatic transmission fluid (ATF) pressurizing the piston P may supply a balance hydraulic pressure to prevent the piston P from pressurizing the clutch packs CP due to centrifugal force generated when the engine clutch EC is rotated at a high speed in an unintended situation.

Figure 3:
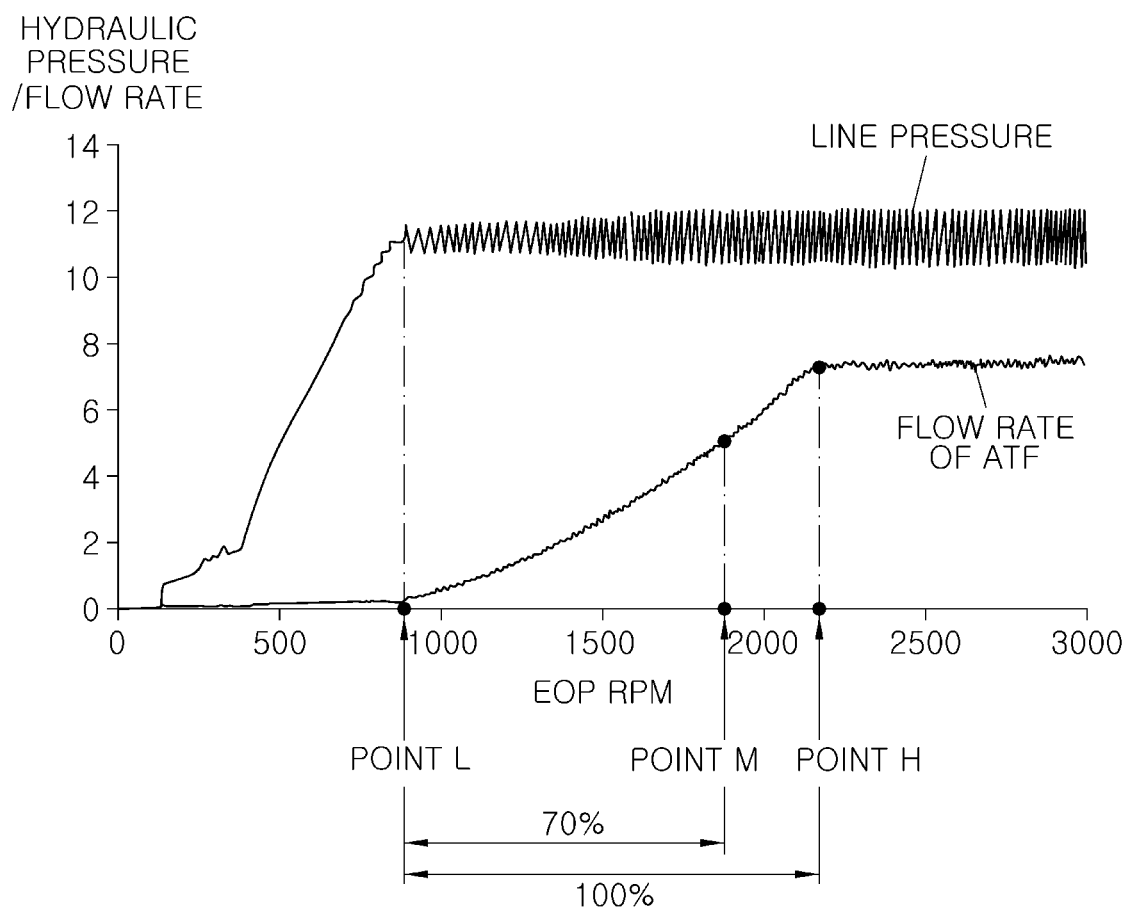
FIG. 3 is a graph representing hydraulic pressure and a flow rate depending on the revolutions per minute (RPM) of an EOP to describe the meaning of a point L used in various exemplary embodiments of the present invention.

In various exemplary embodiments of the present invention, the electric oil pump (EOP) of the above-described hybrid powertrain apparatus is basically controlled based on RPMs at a point L, a point M and a point H, as shown in FIG. 3.

FIG. 3 is a graph representing hydraulic pressure and a flow rate supplied to the transmission depending on the RPM of the EOP, when the EOP is driven to form a target line pressure for controlling the transmission, and here, as the RPM of the EOP increases, the hydraulic pressure first reaches the target line pressure, and thereafter, the hydraulic pressure maintains the target line pressure and the flow rate is gradually raised in a designated section, and after the present section, the flow rate maintains an almost constant level.

The reason for this is that, when the target line pressure is set depending on an input torque input to the transmission, the line pressure of the transmission is continuously maintained to the target line pressure under the control of a regulator valve of a hydraulic circuit.

Here, the RPM at the point H is set to an RPM of the EOP at a point at which the section, in which the flow rate is gradually increased, is terminated and the flow rate starts to maintain the constant level.

That is, the flow rate is gradually raised as the RPM of the EOP increases, and when the flow rate reaches the maximum value, the flow rate maintains the maximum value, as shown in the present figure. Therefore, the minimum RPM of the EOP to form the maximum value of the flow rate is set to the RPM at the point H, the EOP is controlled based on the RPM at the point H, and thereby, the EOP may be driven at the minimum RPM of the EOP to acquire the maximum flow rate in the target line pressure situation, being configured for preventing an unnecessary increase in the RPM of the EOP.

Therefore, "the minimum RPM of the EOP to form the maximum value of the flow rate generated when the corresponding line pressure is formed" does not absolutely mean the minimum RPM of the EOP to form the maximum value of the flow rate, but means the RPM of the EOP at a point in time when the flow rate gradually increased starts to converge on a designated range, as shown in FIG. 3.

The RPM at the point L is set to an RPM of the EOP at a point in time when the hydraulic pressure reaches the target line pressure as the RPM of the EOP increases.

That is, the RPM at the point L means the minimum RPM of the EOP to form the corresponding target line pressure.

Furthermore, the RPM at the point M is an RPM of the EOP which is located between the RPM at the point L and the RPM at the point H, and is determined from among the present RPM range depending on the magnitude of the target line pressure.

For example, the RPM at the point M may be an RPM of the EOP which is determined by applying the percentage (%) of the current target line pressure to the maximum line pressure of the transmission to a section between the RPM at the point L and the RPM at the point H.

Referring to FIG. 3, when the current target line pressure of the transmission is 70% of the maximum line pressure of the transmission, the RPM at the point M is determined as the RPM of the EOP at a point of 70% of the section between the RPM at the point L and the RPM at the point H.

Therefore, the RPM at the point M is varied between the RPM at the point L and the RPM at the point H depending on a change in the target line pressure set in consideration of the torque input to the transmission according to the driving situation of the hybrid vehicle.

For reference, the point L, the point M and the point H may be set differently depending on the temperature of the automatic transmission fluid (ATF).

The point L, the point M and the point H may be used to control the EOP depending on the driving situation of the hybrid vehicle as follows.

For example, in a situation in which the flow path of the transmission must be rapidly charged with the ATF, such as in starting-on of the hybrid vehicle or restarting of the hybrid vehicle after stopping, the EOP is driven at the RPM at the point H to rapidly ensure the sufficient flow rate of the ATF, in a situation in which the consumption of the flow rate of the ATF is very small, such as in stopped state of the hybrid vehicle, the EOP is driven at the RPM at the point L to minimize unnecessary power consumption, and in other driving situations of the hybrid vehicle, the EOP is driven at the RPM at the point M, which is set depending on the power input to the transmission, to secure the appropriate flow rate of the ATF of a necessary level.

Figure 4:
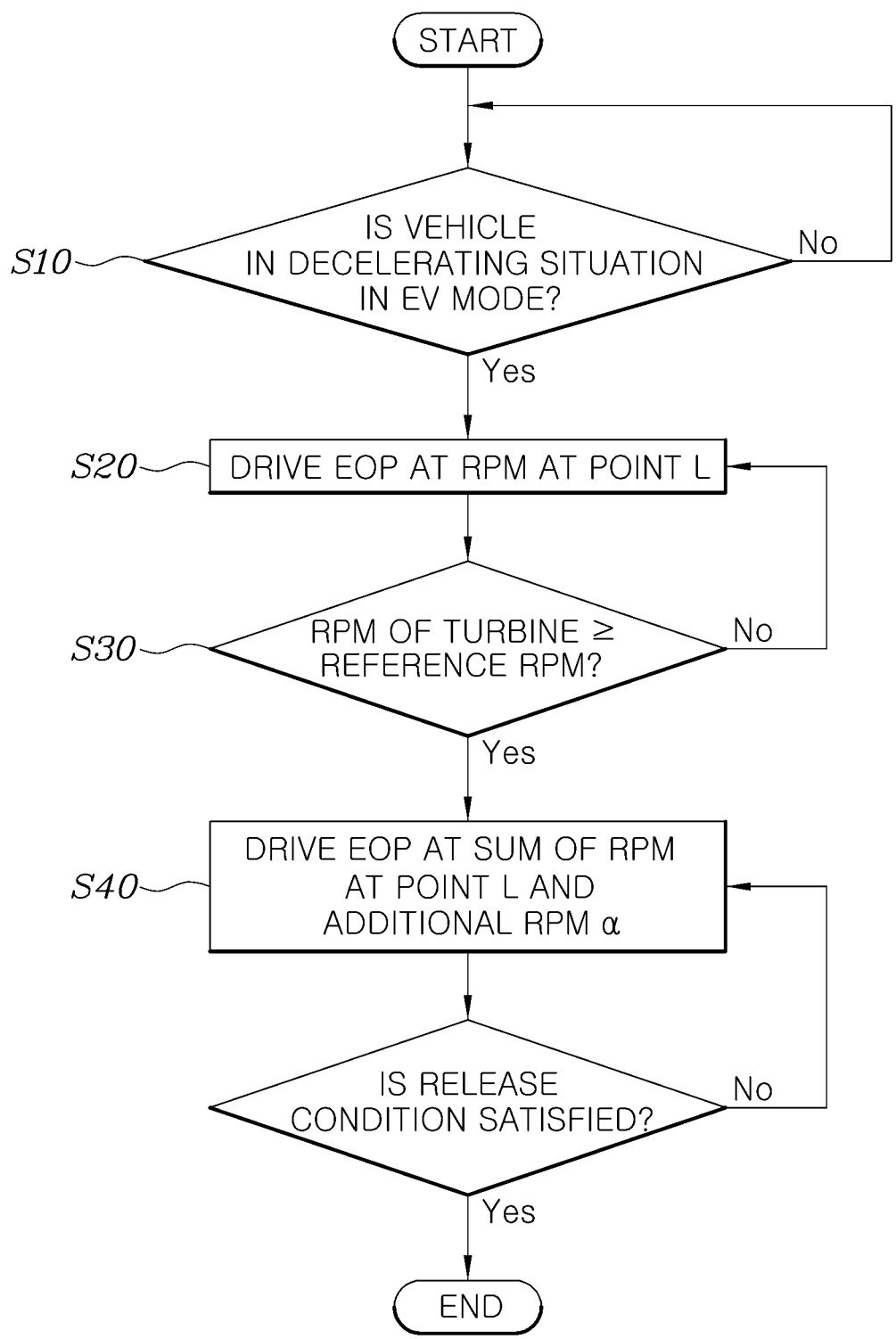
FIG. 4 is a flowchart illustrating a method for controlling an EOP of a hybrid vehicle according to various exemplary embodiments of the present invention.

FIG. 4 is a flowchart illustrating a method for controlling an EOP of a hybrid vehicle according to various exemplary embodiments of the present invention, and the method includes determining whether or not the hybrid vehicle is in a decelerating situation in an EV mode (S10), driving the EOP at the RPM at the point L, which is the minimum RPM of the EOP to form the target line pressure of the transmission, upon determining that the hybrid vehicle is decelerating in the EV mode (S20), determining whether or not the RPM of a turbine is equal to or greater than a designated reference RPM (S30), and driving the EOP at an RPM acquired by adding a designated additional RPM α to secure an additional flow rate supplied to the balance chamber BC of the engine clutch EC to the RPM at the point L, upon determining that the RPM of the turbine is equal to or greater than the predetermined reference RPM (S40).

That is, in various exemplary embodiments of the present invention, when the hybrid vehicle is in the decelerating situation in the EV mode, the EOP is converted from the driving state at the RPM at the point M to the driving state at the RPM at the point L.

Because, in the decelerating situation in the EV mode, the engine clutch EC is disengaged, the power of the engine is not input to the transmission, the power of the motor input to the transmission is reduced and thus a flow rate necessary for the transmission is greatly reduced, the EOP is driven at the RPM at the point L rather than at the RPM at the point M, being configured for minimizing unnecessary power consumption.

However, in the decelerating situation in the EV mode, when the transmission performs downshift to a lower gear as the hybrid vehicle decelerates, the RPM of the turbine or the RPM of the input shaft of the transmission is increased due to an increased gear ratio, the RPM of the engine clutch EC is rapidly increased, the piston P of the engine clutch EC may thus receive pressure in a direction of pressurizing the clutch packs CP due to centrifugal force, and in the instant case, when the EOP is driven at the RPM at the point L, as described above, the flow rate of the ATF supplied to the balance chamber BC to offset the pressure applied to the piston P may be insufficient.

Therefore, in various exemplary embodiments of the present invention, in a situation in which the RPM of the turbine is equal to or greater than the predetermined reference RPM and thus damage to the engine clutch EC is of concern, the EOP is driven at the RPM acquired by adding the above-described additional RPM α to the RPM at the point L to supply a sufficient flow rate of the ATF to the balance chamber BC, being configured for preventing damage to the engine clutch EC and improving durability thereof.

That is, in various exemplary embodiments of the present invention, in the decelerating situation in the EV mode of the hybrid vehicle, the fuel efficiency or the energy efficiency of the hybrid vehicle may be improved by minimizing driving the EOP as much as possible, and damage to the engine clutch EC may be prevented and durability of the engine clutch EC may be improved by appropriately securing the flow rate of the ATF supplied to the balance chamber BC of the engine clutch EC.

The predetermined reference RPM is set to a level at which generation of unintended frictional force of the engine clutch EC due to the centrifugal force of the engine clutch EC is of concern, and to this effect, the predetermined reference RPM may be determined in consideration of an RPM at which damage to the engine clutch EC due to generation of frictional force of the engine clutch EC is of concern and be determined through a large number of experiments and analyses.

When the RPM of the turbine is equal to or less than a designated release RPM lower than the predetermined reference RPM, driving of the EOP at the RPM acquired by adding the additional RPM α to the RPM at the point L (S40) may be terminated, and the EOP may be driven at the previous RPM at the point L, or may be driven at the RPM at the point M or at the RPM at the point H when the driving situation of the hybrid vehicle is changed.

Of course, the release RPM may be set to an RPM of a level at which concern about damage to the engine clutch EC is removed and thus it is not necessary to supply an additional flow rate of the ATF to the balance chamber BC, and may also be determined through a large number of experiments and analyses.

For reference, the RPM of the turbine is employed on the assumption that a transmission provided with a torque converter is used, and in a transmission provided with no torque converter, the RPM of the input shaft of the transmission corresponds to the RPM of the turbine.

Furthermore, when a predetermined maintenance time elapses, driving of the EOP at the RPM acquired by adding the additional RPM α to the RPM at the point L (S40) may be terminated.

Of course, the maintenance time may be set based on statistical evidence that, when the EOP is driven at the RPM acquired by adding the additional RPM α to the RPM at the point L for the maintenance time, damage to the engine clutch EC in the above-described situation may be prevented, acquired through a large number of experiments and analyses.

The point L and the additional RPM α may be set differently depending on the temperature of the ATF.

The reason for this is that the driving characteristics of the EOP are greatly changed depending on the temperature of the ATF, and for example, a map shown in FIG. 5 may be provided so that the OPU controls the EOP by selecting an RPM (L+α) corresponding to the current temperature of the ATF from the map, when the EOP is driven at the RPM acquired by adding the additional RPM α to the RPM at the point L (S40).

For reference, in FIG. 5, L1, L2, L3, etc. Indicate RPMs at different points L corresponding to respective temperatures of the ATF, and α1, α2, α3, etc. Indicate different additional RPMs corresponding to the respective temperatures of the ATF.

Figure 6:
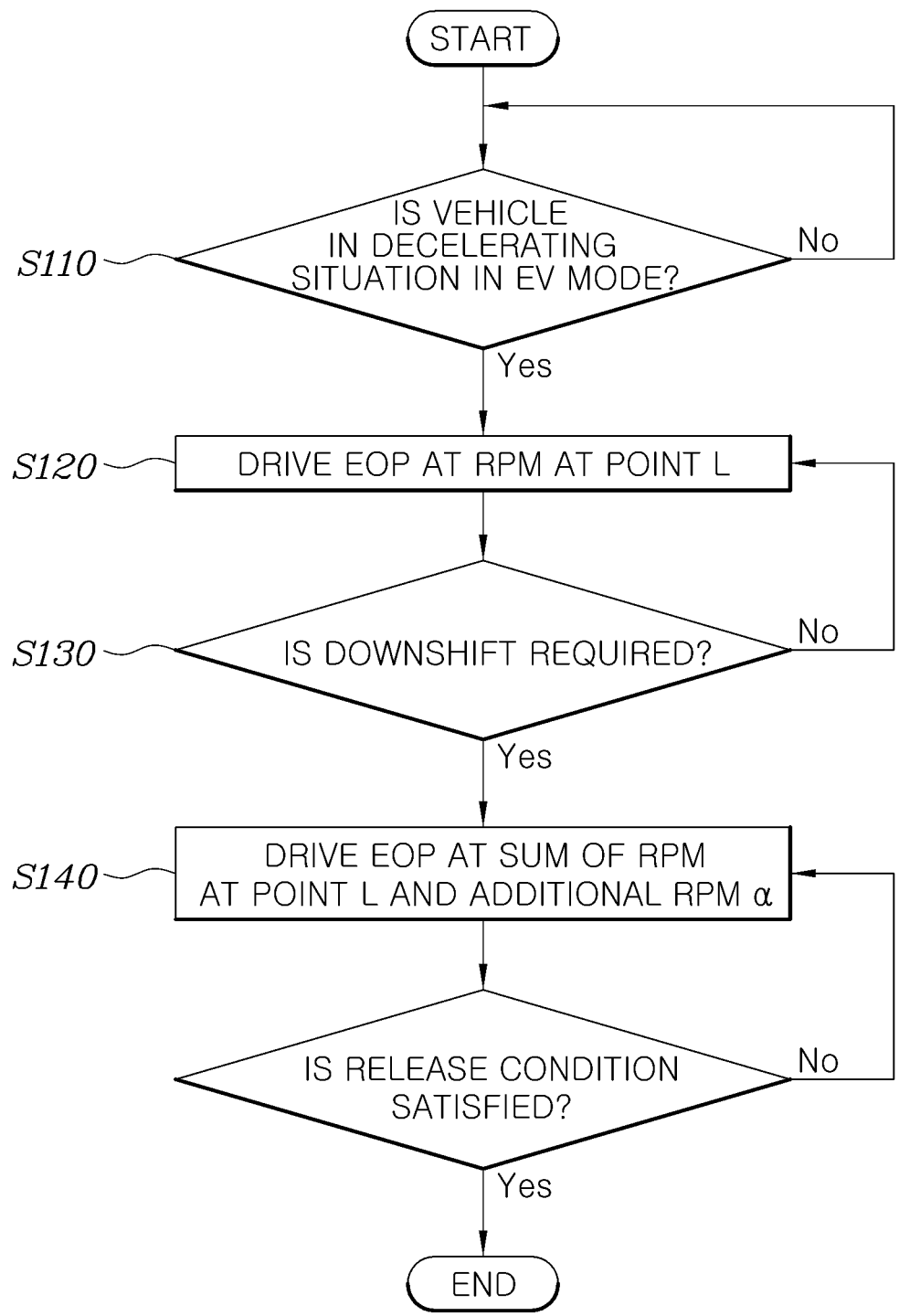
FIG. 6 is a flowchart illustrating a method for controlling an EOP of a hybrid vehicle according to various exemplary embodiments of the present invention.

FIG. 6 is a flowchart illustrating a method for controlling an EOP of a hybrid vehicle according to various exemplary embodiments of the present invention, and the method includes determining whether or not the hybrid vehicle is in a decelerating situation in an EV mode (S110), driving the EOP at the RPM at the point L, which is the minimum RPM of the EOP to form the target line pressure of the transmission, upon determining that the hybrid vehicle is decelerating in the EV mode (S120), determining whether or not the hybrid vehicle is in a situation in which downshift from the current gear to a lower gear is required (S130), and driving the EOP at an RPM acquired by adding a designated additional RPM α to secure an additional flow rate supplied to the balance chamber BC of the engine clutch EC to the RPM at the point L, upon determining that the hybrid vehicle is when downshift is required (S140).

That is, the present exemplary embodiment of the present invention is the same as the former embodiment except that it is determined whether or not the EOP is driven at the sum of the RPM at the point L and the additional RPM α by determining whether or not the hybrid vehicle is when downshift is required.

The situation of the hybrid vehicle in which downshift is required may be determined by a vehicle speed, a shift map, etc., and in the instant case, the RPM of the EOP may be changed to the sum of the RPM at the point L and the additional RPM α before or simultaneously with starting of downshift of the transmission, and thus, a sufficient balance hydraulic pressure may be more rapidly supplied to the balance chamber BC, being configured for more advantageously protecting the engine clutch EC.

When the RPM of a turbine is equal to or less than a designated release RPM after downshift of the transmission is completed, driving of the EOP at the RPM acquired by adding the additional RPM α to the RPM at the point L (S140) may be terminated.

The release RPM may be set to an RPM of a level at which it is not necessary to supply an additional flow rate of the ATF to the balance chamber BC of the engine clutch EC any more, and may also be determined through a large number of experiments and analyses.

Furthermore, when a designated maintenance time elapses after downshift of the transmission is completed, driving of the EOP at the RPM acquired by adding the additional RPM α to the RPM at the point L (S140) may be terminated.

The maintenance time may be set using the same method as used to set the maintenance time in the former embodiment.

In the exemplary embodiment of the present invention, the point L and the additional RPM α may be set differently depending on the temperature of the ATF.

As is apparent from the above description, a method for controlling an electric oil pump (EOP) of a vehicle according to various exemplary embodiments of the present invention may improve the fuel efficiency or energy efficiency of the hybrid vehicle by minimizing driving of the EOP as much as possible, and may appropriately secure the flow rate of automatic transmission fluid (ATF) supplied to a balance chamber of an engine clutch to prevent damage to the engine clutch and to improve durability thereof.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling an electric oil pump (EOP) of a hybrid vehicle, the method comprising:
   determining, by a controller, whether the hybrid vehicle is in a decelerating situation in an electric vehicle (EV) mode;
   driving, by the controller, the EOP at revolutions per minute (RPM) at a point L, which corresponds to a minimum RPM of the EOP to form a target line pressure of a transmission, upon determining that the hybrid vehicle is decelerating in the EV mode;
   determining, by the controller, whether an RPM of a turbine is equal to or greater than a predetermined reference RPM; and
   driving, by the controller, the EOP at an RPM acquired by adding a predetermined additional RPM to secure an additional flow rate of automatic transmission fluid supplied to a balance chamber of an engine clutch to the RPM at the point L, upon determining that the RPM of the turbine is equal to or greater than the predetermined reference RPM.

2. The method of claim 1, wherein the controller is configured to terminate the driving the EOP at the RPM acquired by adding the additional RPM to the RPM at the point L when the controller determines that the RPM of the turbine is equal to or less than a predetermined release RPM lower than the predetermined reference RPM.

3. The method of claim 1, wherein the controller is configured to terminate the driving the EOP at the RPM acquired by adding the additional RPM to the RPM at the point L when a predetermined maintenance time elapses.

4. The method of claim 1, wherein the point L and the additional RPM are set differently depending on a temperature of the automatic transmission fluid.

5. The method of claim 1, wherein the predetermined reference RPM is set to a level at which unintended frictional force of the engine clutch due to centrifugal force of the engine clutch is generated.

6. A non-transitory computer readable storage medium on which a program for performing the method of claim 1 is recorded.

7. A method for controlling an electric oil pump (EOP) of a hybrid vehicle, the method comprising:
- determining, by a controller, whether the hybrid vehicle is in a decelerating situation in an electric vehicle (EV) mode;
- driving, by the controller, the EOP at revolutions per minute (RPM) at a point L, which corresponds to a minimum RPM of the EOP to form a target line pressure of a transmission, upon determining that the hybrid vehicle is decelerating in the EV mode;
- determining, by the controller, whether the hybrid vehicle is in a situation in which downshift from a current gear to a lower gear is required; and
- driving, by the controller, the EOP at an RPM acquired by adding a predetermined additional RPM to secure an additional flow rate of automatic transmission fluid supplied to a balance chamber of an engine clutch to the RPM at the point L, upon determining that the downshift is required.

8. The method of claim 7, wherein the controller is configured to terminate the driving the EOP at the RPM acquired by adding the additional RPM to the RPM at the point L when the controller determines that an RPM of a turbine is equal to or less than a predetermined release RPM after downshift is completed.

9. The method of claim 7, wherein the controller is configured to terminate the driving the EOP at the RPM acquired by adding the additional RPM to the RPM at the point L when a predetermined maintenance time elapses after the downshift is completed.

10. The method of claim 7, wherein the point L and the additional RPM are set differently depending on a temperature of the automatic transmission fluid.

11. A non-transitory computer readable storage medium on which a program for performing the method of claim 7 is recorded.

* * * * *